US012695904B2

(12) United States Patent
Zhao et al.

(10) Patent No.: US 12,695,904 B2
(45) Date of Patent: *Jul. 28, 2026

(54) EXPLICIT SIGNALING OF SCALING FACTORS FOR JOINT CODING OF MOTION VECTOR DIFFERENCE

(71) Applicant: TENCENT AMERICA LLC, Palo Alto, CA (US)

(72) Inventors: Liang Zhao, Sunnyvale, CA (US); Xin Zhao, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/743,661

(22) Filed: Jun. 14, 2024

(65) Prior Publication Data

US 2024/0333970 A1     Oct. 3, 2024

Related U.S. Application Data

(63) Continuation of application No. 17/983,089, filed on Nov. 8, 2022, now Pat. No. 12,052,437.

(Continued)

(51) Int. Cl.
*H04N 19/573* (2014.01)
*H04N 19/105* (2014.01)
(Continued)

(52) U.S. Cl.
CPC ......... *H04N 19/573* (2014.11); *H04N 19/105* (2014.11); *H04N 19/139* (2014.11);
(Continued)

(58) Field of Classification Search
CPC .. H04N 19/105; H04N 19/139; H04N 19/172; H04N 19/176; H04N 19/30; H04N 19/52; H04N 19/573; H04N 19/70
(Continued)

(56) References Cited

U.S. PATENT DOCUMENTS

| | | | |
|---|---|---|---|
| 12,052,437 B2 * | 7/2024 | Zhao ..................... | H04N 19/573 |
| 2005/0053137 A1 * | 3/2005 | Holcomb ............. | H04N 19/463 |
| | | | 375/E7.138 |

(Continued)

FOREIGN PATENT DOCUMENTS

| | | |
|---|---|---|
| KR | 10-2005-0025567 A | 3/2005 |
| KR | 20180044269 A | 5/2018 |

(Continued)

OTHER PUBLICATIONS

International Search Report dated Feb. 27, 2023 from the International Searching Authority in International Application No. PCT/US2022/049503.

(Continued)

*Primary Examiner* — Christopher S Kelley
*Assistant Examiner* — Ana Picon-Feliciano
(74) *Attorney, Agent, or Firm* — Sughrue Mion, PLLC

(57) ABSTRACT

Systems and methods for receiving a coded video bitstream including a current frame, a first reference frame and a second reference frame associated with a current block in the current frame, a joint motion vector difference (JMVD) associated with the first reference frame and the second reference frame, and a flag indicating whether one or more scaling factors are used to derive a motion vector difference (MVD) from the JMVD. A first/second MVD associated with the first/second reference frame may be derived based on applying a first/second scaling factor in the one or more scaling factors to the JMVD or based on a distance between (Continued)

200

RECEIVE CODED BITSTREAM INCLUDING JMVD FOR A CURRENT BLOCK OF A CURRENT FRAME AND SCALING FACTOR(S) — 201

DERIVE FIRST MVD ASSOCIATED WITH A FIRST REFERENCE FRAME — 202

DERIVE SECOND MVD ASSOCIATED WITH A SECOND REFERENCE FRAME — 203

DECODE CURRENT BLOCK BASED ON FIRST MVD AND SECOND MVD — 204 the first/second reference frame and the current frame. The current block may be decoded based on the first MVD and the second MVD.

20 Claims, 2 Drawing Sheets

Related U.S. Application Data

(60) Provisional application No. 63/328,062, filed on Apr. 6, 2022.

(51) Int. Cl.
| | |
|---|---|
| *H04N 19/139* | (2014.01) |
| *H04N 19/172* | (2014.01) |
| *H04N 19/176* | (2014.01) |
| *H04N 19/30* | (2014.01) |
| *H04N 19/52* | (2014.01) |
| *H04N 19/70* | (2014.01) |

(52) U.S. Cl.
CPC ......... *H04N 19/172* (2014.11); *H04N 19/176* (2014.11); *H04N 19/30* (2014.11); *H04N 19/52* (2014.11); *H04N 19/70* (2014.11)

(58) Field of Classification Search
USPC .................................................. 375/240.16
See application file for complete search history.

(56) References Cited

U.S. PATENT DOCUMENTS

| | | | |
|---|---|---|---|
| 2017/0223350 A1 | 8/2017 | Xu et al. | |
| 2018/0234686 A1* | 8/2018 | Zhu ........................ | H04N 19/30 |
| 2018/0278951 A1 | 9/2018 | Seregin et al. | |
| 2020/0404253 A1* | 12/2020 | Chen ........................ | B23P 15/00 |
| 2021/0203945 A1 | 7/2021 | Liu et al. | |
| 2022/0094913 A1 | 3/2022 | Xiu et al. | |
| 2023/0007253 A1* | 1/2023 | Wang ..................... | H04N 19/18 |

FOREIGN PATENT DOCUMENTS

| | | |
|---|---|---|
| KR | 10-2132047 B1 | 7/2020 |
| WO | 2020/221256 A1 | 11/2020 |
| WO | 2021/146041 A1 | 7/2021 |
| WO | 2021/170091 A1 | 9/2021 |

OTHER PUBLICATIONS

Written Opinion dated Feb. 27, 2023 from the International Searching Authority in International Application No. PCT/US2022/049503.

Benjamin Bross, et al., "Versatile Video Coding Editorial Refinements on Draft 10", Document: JVET-T2001-v2, Joint Video Experts Team (JVET) of ITU-T SG 16 WP 3 and ISO/IEC JTC 1/SC 29 20th Meeting, by teleconference, Oct. 7-16, 2020.

Leo Zhao, et al., "Improved adaptive MVD resolution", Tencent, Alliance for Open Media, Codec Working Group, Document: CWG-C011, Feb. 9, 2022, pp. 1-7.

Leo Zhao, et al., "Advanced motion vector difference coding", Alliance for Open Media, Codec Working Group, Document: CWG-B092, Nov. 24, 2021, pp. 1-7.

Xin Zhao, et al., "Tool Description for AV1 and libao", Alliance for Open Media Codec Working Group, Document: CWG-B078_v1, Oct. 4, 2021, pp. 1-41.

Lester (Keng-Shih) Lu, et al., "Optical Flow Motion Vector Refinement for AV2", Alliance for Open Media Codec Working Group, Document: CWG-B041_v3, Sep. 20, 2021, pp. 1-11.

Elliott Karpilovsky, et al., "Proposal: New Inter Modes for AV2", Alliance for Open Media Codec Working Group, Document:CWG-B018_v1, Feb. 24, 2021, pp. 1-6.

Yue Chen, et al., "An Overview of Core Tools in the AV1 Video Codec", PCS, 2018, pp. 41-45.

Peter de Rivaz, et al., "AV1 Bitstream & Decoding Process Specification", AV1 Bitstream & Decoding Process Specification, pp. 1-681.

Communication issued Jan. 8, 2026 in KR Application No. 10-2023-7034927.

Office Action issued Jan. 1, 2026 in Indian Application No. 202337064402.

* cited by examiner

100

<u>200</u>

RECEIVE CODED BITSTREAM INCLUDING
JMVD FOR A CURRENT BLOCK OF A CURRENT
FRAME AND SCALING FACTOR(S)          <u>201</u>

DERIVE FIRST MVD ASSOCIATED WITH A
FIRST REFERENCE FRAME          <u>202</u>

DERIVE SECOND MVD ASSOCIATED WITH A
SECOND REFERENCE FRAME          <u>203</u>

DECODE CURRENT BLOCK BASED ON FIRST
MVD AND SECOND MVD          <u>204</u>

EXPLICIT SIGNALING OF SCALING FACTORS FOR JOINT CODING OF MOTION VECTOR DIFFERENCE

CROSS-REFERENCE TO RELATED APPLICATION(S)

This application is a Continuation of U.S. application Ser. No. 17/983,089 filed Nov. 8, 2022, which claims priority to U.S. Provisional Application No. 63/328,062, filed on Apr. 6, 2022, in the U.S. Patent and Trademark Office, the disclosure of which being incorporated by reference herein in its entirety.

BACKGROUND

1. Field

The disclosure relates to advanced image and video coding technologies, and more specifically, systems and methods for explicit signaling of scaling factors for joint coding of motion vector difference.

2. Description of Related Art

Streaming audiovisual content has gained in popularity. Substantial bandwidth is needed to facilitate the increasing quantity and increasing quality of such streaming content. Therefore there is a need for efficient coding and decoding schemes for streaming the content using less bandwidth while maintaining high quality. For example, H.265/HEVC, VP9, and AOMedia Video 1 (AV1) are some of the coding and decoding schemes that have been developed for this purpose.

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4).

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on Sep. 12, 2014, and Cisco's Thor was published on Aug. 11, 2015. Building on the codebase of VP9, AV1 incorporates additional techniques, several of which were developed in these experimental formats. The first version 0.1.0 of the AV1 reference codec was published on Apr. 7, 2016. The Alliance announced the release of the AV1 bitstream specification on Mar. 28, 2018, along with a reference, software-based encoder and decoder. On Jun. 25, 2018, a validated version 1.0.0 of the specification was released. On Jan. 8, 2019 a validated version 1.0.0 with Errata 1 of the specification was released. The AV1 bitstream specification includes a reference video codec.

Research and development for next-generation video codecs is also underway. For example, AOMedia has formally launched the standardization of the next-generation video codec called Versatile Video Coding (VVC).

SUMMARY

According to an aspect of the disclosure, there is provided a method that includes: receiving a coded video bitstream including a current frame, a first reference frame and a second reference frame associated with a current block in the current frame, a joint motion vector difference (JMVD) associated with the first reference frame and the second reference frame, and a flag indicating whether one or more scaling factors are used to derive a motion vector difference (MVD) from the JMVD; deriving a first MVD associated with the first reference frame based on applying a first scaling factor in the one or more scaling factors to the JMVD or based on a distance between the first reference frame and the current frame; deriving a second MVD associated with the second reference frame based on applying a second scaling factor in the one or more scaling factors to the JMVD or based on a distance between the second reference frame and the current frame; and decoding the current block based on the first MVD and the second MVD.

According to other aspects of the disclosure, an apparatus and computer readable medium consistent with the method are also provided.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

Figure 1:
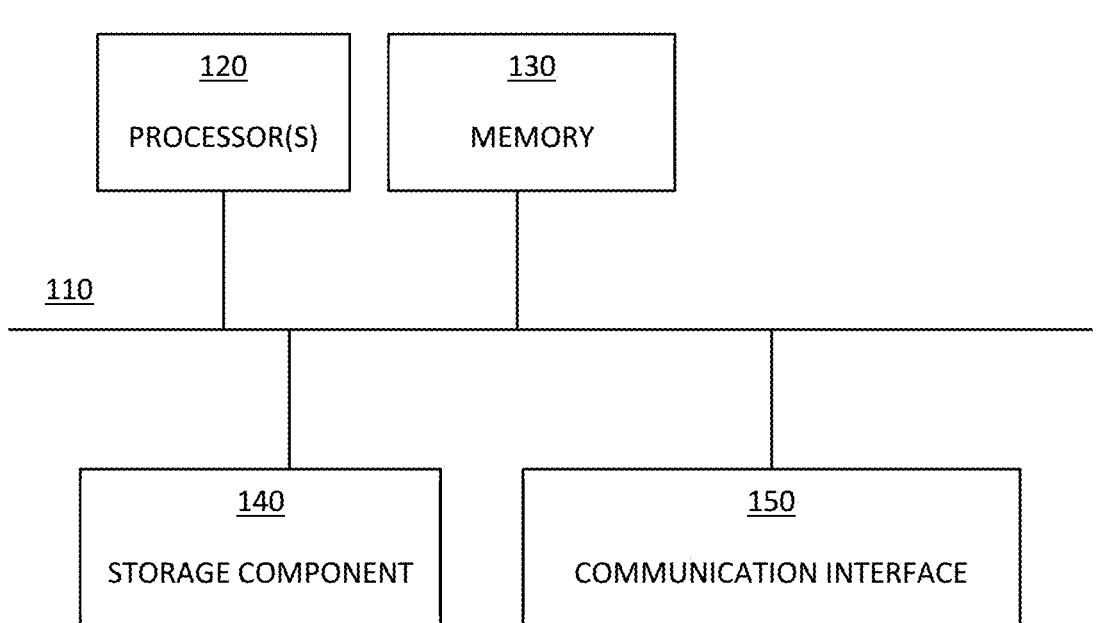
FIG. 1 is a diagram illustrating components of one or more devices, according to an various embodiments.

VVC includes several improvements, such as the introduction of joint motion vector difference (JMVD) coding. This new inter prediction coding mode, named as JOINT_NEWMV, is applied to indicate whether the motion vector differences (MVDs) for two reference lists are jointly signaled. If the inter prediction mode is equal to JOINT_NEWMV mode, MVDs for a reference list 0 and a reference list 1 are jointly signaled, and only one MVD, named as joint_mvd, is signaled and transmitted to a decoder which derives the MVDs for reference list 0 and reference list 1 from joint_mvd. Generally, JOINT_NEWMV mode is signaled together with NEAR_NEARMV, NEAR_NEWMV, NEW_NEARMV, NEW_NEWMV, and GLOBAL_GLOBALMV mode. No additional contexts are added.

When JOINT_NEWMV mode is signaled, and the picture order count (POC) distance between two reference frames and the current frame is different, the MVD is scaled for reference list 0 or reference list 1 based on the POC distance. For example, if the distance (td0) between reference frame list 0 and the current frame is equal to or larger than the distance (td1) between reference frame list 1 and the current frame joint_mvd is directly used for reference list 0 and the MVD for reference list 1 is derived from joint_mvd based on equation (1):

$$derived\_mvd = \frac{td1}{td0} * joint\_mvd \qquad (1)$$

Otherwise, if td1 is equal to or larger than td0, joint_mvd is directly used for reference list 1 and the MVD for reference list 0 is derived from joint_mvd based on equation (2):

$$derived\_mvd = \frac{td0}{td1} * joint\_mvd \qquad (2)$$

When JMVD mode is selected for a block, a JMVD is signaled for two reference frames, and a MVD for the two reference frames is derived from the JMVD based on the distance between reference frames and a current frame. This assumes that there is a linear motion between a backward reference frame and a forward reference frame, with respect to the current frame. However, the motion between the two reference frames may not always be a linear motion. For example, the motion could become slower or faster from the backward reference frame to the forward reference frame.

According to an aspect of the disclosure, there is provided a method that includes: receiving a coded video bitstream including a current frame, a first reference frame, a second reference frame, a joint motion vector difference (MVD) associated with a current block of the current frame, and a flag signaling one or more scaling factors; deriving a first MVD associated with the first reference frame based on the one or more scaling factors or a distance between the first reference frame and the current frame; deriving a second MVD associated with the second reference frame based on the one or more scaling factors or a distance between the second reference frame and the current frame; and decoding the current block based on the first MVD and the second MVD In some embodiments, the signaling flag includes a pair of scaling factors for the first reference frame and the second reference frame In some embodiments, the one or more scaling factors are restricted to values of $2^n$, where n is an integer value.

In some embodiments, the one or more scaling factors are restricted to values of m/M, where $M=2^n$ and m and n are integer values.

In some embodiments, the one or more scaling factors is one scaling factor and, when the signaling flag indicates that the one scaling factor is not equal to a first default value, the one scaling factor is used to derive one of the first MVD and the second MVD, and a scaling factor used to derive the other one of the first MVD and the second MVD is a second default value different than the first default value.

In some embodiments, a context for signaling the one or more scaling factors is based on encoded information of the current block or one or more neighboring blocks to the current block.

In some embodiments, the context is based on a block size of the current block, wherein the one or more scaling factors include a first set of scaling factors when the block size of the current block is equal to or smaller than a first threshold size, and the one or more scaling factors include a second set of scaling factors when the block size of the current block is larger than the first threshold size.

In some embodiments, the block size corresponds to one or more of a block width, a block height, a number of pixels in current block, a minimum block width, a minimum block height, a maximum block width, and a maximum block height.

In some embodiments, the context is based on whether a motion vector prediction (MVP) for the current block is symmetric.

In some embodiments, the context is based on an index of a motion vector prediction (MVP) candidate for the current block.

In some embodiments, a syntax is signaled in one of a sequence header, frame header, or slice header to indicate whether the signaling flag is included in the coded bitstream.

In some embodiments, the first reference frame belongs to a list of backward reference frames and the second reference frame belongs to a list of forward reference frames, or the first reference frame belongs to a list of forward reference frames, and the second reference frame belongs to a list of backward reference frames.

In some embodiments, the first MVD and/or the second MVD is derived according to $$derived\_mvd = \frac{td1}{td0} * scaled\_factor * joint\_mvd,$$

when td1 is greater than td0; and according to $$derived\_mvd = \frac{td0}{td1} * scaled\_factor * joint\_mvd,$$

when td0 is greater than td1. Here td0 corresponds to the distance between the first reference frame and the current frame, and td1 corresponds to a distance between the second reference frame and the current frame.

In some embodiments, the first MVD and/or the second MVD is derived according to $$derived\_mvd = \frac{td1}{td0} * \frac{scaled\_factor}{M} * joint\_mvd,$$

when td1 is greater than td0; and according to $$derived\_mvd = \frac{td0}{td1} * \frac{scaled\_factor}{M} * joint\_mvd,$$

when td0 is greater than td1. Here, td0 corresponds to a distance between the current frame and the first reference frame, td1 corresponds to a distance between the current frame and the second reference frame, and M corresponds to $2^n$ where n is an integer.

According to an aspect of the disclosure, there is provided an apparatus that includes a memory storing program code; and at least one processor configured to execute the program code and operate as instructed by the program code, the programming code including: receiving code configured to cause at least one of the at least one processor to receive a coded video bitstream including a current frame, a first reference frame, a second reference frame, a JMVD associated with a current block of the current frame, and a flag signaling one or more scaling factors; deriving code configured to cause at least one of the at least one processor to derive a first MVD associated with the first reference frame based on the one or more scaling factors or a distance between the first reference frame and the current frame; deriving code configured to cause at least one of the at least one processor to derive a second MVD associated with the second reference frame based on the one or more scaling factors or a distance between the second reference frame and the current frame; and decoding code configured to cause at least one of the at least one processor to decode the current block based on the first MVD and the second MVD.

In some embodiments, the one or more scaling factors is one scaling factor and, when the signaling flag indicates that the one scaling factor is not equal to a first default value, the one scaling factor is used to derive one of the first MVD and the second MVD, and a scaling factor used to derive the other one of the first MVD and the second MVD is a second default value different than the first default value.

In some embodiments, a context for signaling the one or more scaling factors is based on encoded information of the current block or one or more neighboring blocks to the current block.

According to an aspect of the disclosure, there is provided a non-transitory computer readable medium that stores computer readable program code which, when executed by a processor, cause the processor to at least: receive a coded video bitstream including a current frame, a first reference frame, a second reference frame, a JMVD associated with a current block of the current frame, and a flag signaling one or more scaling factors; derive a first MVD associated with the first reference frame based on the one or more scaling factors or a distance between the first reference frame and the current frame; derive a second MVD associated with the second reference frame based on the one or more scaling factors or a distance between the second reference frame and the current frame; and decode the current block based on the first MVD and the second MVD.

In some embodiments, the one or more scaling factors is one scaling factor and, when the signaling flag indicates that the one scaling factor is not equal to a first default value, the one scaling factor is used to derive one of the first MVD and the second MVD, and a scaling factor used to derive the other one of the first MVD and the second MVD is a second default value different than the first default value.

In some embodiments, a context for signaling the one or more scaling factors is based on encoded information of the current block or one or more neighboring blocks to the current block.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flow diagrams and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As set forth above, when JMVD mode is selected for a block, a JMVD is signaled for two reference frames, and a MVD for the two reference frames is derived from the JMVD based on the distance between reference frames and a current frame. This assumes that there is a linear motion between a backward reference frame and a forward reference frame, with respect to the current frame. However, the motion between the two reference frames may not always be a linear motion. For example, the motion could become slower or faster from the backward reference frame to the forward reference frame.

Various embodiments according to the disclosure provide a system and method for template matching based scaling factor derivation for joint coding of motion vector difference (JMVD). When JMVD mode is selected for a current block, template areas are defined for the current block and its prediction blocks in reference frame lists corresponding to each motion vector difference (MVD). The templates may be used to derive a predicted scaling factor of the MVD before it is used for fetching a prediction block.

FIG. 1 is a diagram illustrating components of one or more devices according to an various embodiments. Referring to FIG. 1, the device 100 may include a bus 110, one or more processor(s) 120, a memory 130, a storage component 140, and a communication interface 150. It is understood that one or more of the components may be omitted and/or one or more additional components may be included.

The bus 110 includes a component that permits communication among the components of the device 100. The processor 120 may be implemented in hardware, firmware, or a combination of hardware and software. The processor 120 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a sparse tensor core, or another type of processing component. The processor 120 may include one or more processors. For example, the processor 120 may include one or more CPU, APU, FPGA, ASIC, sparse tensor core, or another type of processing component. The one or more processors of the processor 120 may be capable of being programmed to perform a function.

The memory 130 includes a random access memory (RAM), a read only memory (ROM), and/or another type of dynamic or static storage device (e.g., a flash memory, a magnetic memory, and/or an optical memory) that stores information and/or instructions for use by the processor 120.

The storage component 140 stores information and/or software related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The communication interface 150 includes a transceiver-like component (e.g., a transceiver and/or a separate receiver and transmitter) that enables the device 100 to communicate with other devices, such as via a wired connection, a wireless connection, or a combination of wired and wireless connections. The communication interface 150 may permit the device 100 to receive information from another device and/or provide information to another device. For example, the communication interface 150 may include an Ethernet interface, an optical interface, a coaxial interface, an infrared interface, a radio frequency (RF) interface, a universal serial bus (USB) interface, a Wi-Fi interface, a cellular network interface, or the like.

The device 100 may perform one or more processes or functions described herein. The device 100 may perform operations based on the processor 120 executing software instructions stored by a non-transitory computer-readable medium, such as the memory 130 and/or the storage component 140. A computer-readable medium is defined herein as a non-transitory memory device. A memory device includes memory space within a single physical storage device or memory space spread across multiple physical storage devices.

Software instructions may be read into the memory 130 and/or the storage component 140 from another computer-readable medium or from another device via the communication interface 150. When executed, software instructions stored in the memory 130 and/or storage component 140 may cause the processor 120 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, device 100 may include additional components, fewer components, different components, or differently arranged components than those shown in FIG. 1. Additionally, or alternatively, a set of components (e.g., one or more components) of device 100 may perform one or more functions described as being performed by another set of components of device 100.

Any one of the operations or processes described below (e.g., FIG. 2-3) may be implemented by or using any one of the elements illustrated in FIG. 1.

Figure 2:
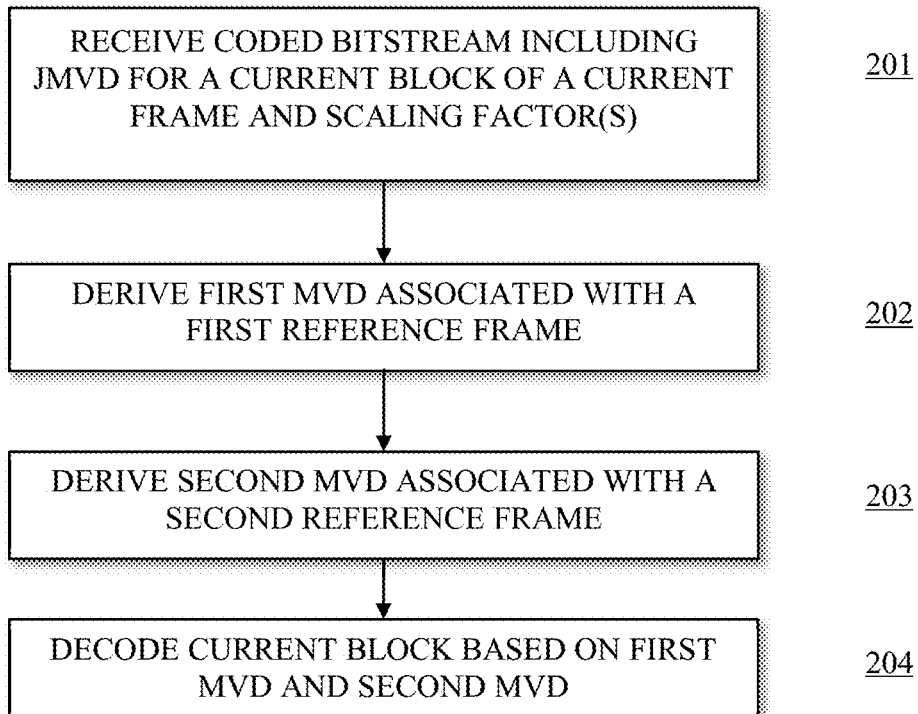
FIG. 2 is a diagram illustrating a method for explicit signaling of scaling factors for joint coding of motion vector difference, according to various embodiments.

FIG. 2 is a diagram illustrating a method 200 for explicit signaling of scaling factors for joint coding of motion vector difference, according to various embodiments.

At 201, the method 200 includes receiving a coded bitstream including a current frame, a first reference frame and a second reference frame associated with a current block in the current frame, a joint motion vector difference (JMVD) associated with the first reference frame and the second reference frame, and a flag indicating whether one or more scaling factors are used to derive a motion vector difference (MVD) from the JMVD.

In some embodiments, the first reference frame may belong to a list of backward reference frames, and the second reference frame may belong to a list of forward reference frames. In some embodiments, the first reference frame may belong to a list of forward reference frames, and the second reference frame may belong to a list of backward reference frames.

In some embodiments, the signaling flag includes a pair of scaling factors for the first reference frame and the second reference frame.

In some embodiments, the one or more scaling factors are restricted to values of $2^n$, where n is an integer value.

In some embodiments, the one or more scaling factors are restricted to values of m/M, where $M=2^n$ and m and n are integer values.

In some embodiments, a context for signaling the one or more scaling factors is based on encoded information of the current block or one or more neighboring blocks to the current block. The context may be based on a block size of the current block, where the one or more scaling factors include a first set of scaling factors when the block size of the current block is equal to or smaller than a first threshold size, and the one or more scaling factors include a second set of scaling factors when the block size of the current block is larger than the first threshold size. The block size may correspond to one or more of a block width, a block height, a number of pixels in current block, a minimum block width, a minimum block height, a maximum block width, and a maximum block height. In some embodiments, the context is based on whether a motion vector prediction (MVP) for the current block is symmetric. In some embodiments, the context is based on an index of a motion vector prediction (MVP) candidate for the current block.

In some implementations, a syntax is signaled in one of a sequence header, frame header, or slice header to indicate whether the signaling flag is included in the coded bitstream.

At 202, the method 200 includes deriving a first MVD associated with a first reference frame. For example, the device 100 may derive a first MVD associated with the first reference frame based on applying a first scaling factor in the one or more scaling factors to the JMVD or based on a distance between the first reference frame and the current frame. In some embodiments, the one or more scaling factors is one scaling factor and, when the device 100 determines that the signaling flag indicates that the one scaling factor is not equal to a first default value, the device 100 uses the one scaling factor to derive one of the first MVD and the second MVD, and the device 100 uses a second default value different than the first default value to derive the other one of the first MVD and the second MVD.

In some embodiments, the first MVD is derived according to $$derived\_mvd = \frac{td1}{td0} * scaled\_factor * joint\_mvd,$$

when td1 is greater than td0, and according to $$derived\_mvd = \frac{td0}{td1} * scaled\_factor * joint\_mvd,$$

when td0 is greater than td1, where td0 corresponds to the distance between the first reference frame and the current frame, and td1 corresponds to a distance between the second reference frame and the current frame.

In some embodiments, the first MVD and/or the second MVD is derived according to $$derived\_mvd = \frac{td1}{td0} * \frac{scaled\_factor}{M} * joint\_mvd,$$

when td1 is greater than td0, and according to $$derived\_mvd = \frac{td0}{td1} * \frac{scaled\_factor}{M} * joint\_mvd,$$

when td0 is greater than td1, where td0 corresponds to a distance between the current frame and the first reference frame, td1 corresponds to a distance between the current frame and the second reference frame, and M corresponds to $2^n$ where n is an integer.

At 203, the method 200 includes deriving a second MVD associated with a second reference frame. For example, the device 100 may derive a second MVD associated with the second reference frame based on applying a second scaling factor in the one or more scaling factors to the JMVD or based on a distance between the second reference frame and the current frame.

In some embodiments, the second MVD is derived according to $$derived\_mvd = \frac{td1}{td0} * scaled\_factor * joint\_mvd,$$

when td1 is greater than td0, and according to $$derived\_mvd = \frac{td0}{td1} * scaled\_factor * joint\_mvd,$$

when td0 is greater than td1, where td0 corresponds to the distance between the first reference frame and the current frame, and td1 corresponds to a distance between the second reference frame and the current frame.

At 204, the method 200 includes decoding the current frame based on the first MVD and the second MVD. For example, the device 100 may decode the current block based on the first MVD and the second MVD.

In some embodiments, the first MVD and/or the second MVD is derived according to $$derived\_mvd = \frac{td1}{td0} * \frac{scaled\_factor}{M} * joint\_mvd,$$

when td1 is greater than td0, and according to $$derived\_mvd = \frac{td0}{td1} * \frac{scaled\_factor}{M} * joint\_mvd,$$

when td0 is greater than td1, where td0 corresponds to a distance between the current frame and the first reference frame, td1 corresponds to a distance between the current frame and the second reference frame, and M corresponds to $2^n$ where n is an integer.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flow diagram and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow diagram and/or block diagram block or blocks.

The flow and block diagrams in the Figures illustrate the architecture, functionality, and operation of possible implementations of systems, methods, and computer readable media according to various embodiments. In this regard, each block in the flow diagram or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flow diagram illustration, and combinations of blocks in the block diagrams and/or flow diagram illustration, may be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for video decoding in a decoder, the method comprising:

receiving a video bitstream comprising a current block, in a current frame, a first variable, a first reference frame associated with the current block, and a second reference frame associated with the current block;

deriving a first motion vector difference (MVD) associated with the first reference frame based on the first variable indicating a first scaling factor in a joint motion vector difference (JMVD) mode;

deriving a second MVD associated with the second reference frame based on the first variable indicating any of the first scaling factor and a second scaling factor in the JMVD mode; and decoding the current block based on the first MVD and the second MVD.

2. The method of claim 1, wherein the video bitstream is associated with the JMVD and a second variable indicating whether the one or more scaling factors are used to derive the MVD from the JMVD, and wherein the second variable indicates a pair of scaling factors for the first reference frame and the second reference frame.

3. The method of claim 1, wherein the one or more scaling factors are restricted to at least one of:

values of $2^n$, where n is an integer value, and values of m/M, where $M=2^n$ and m and n are integer values.

4. The method of claim 1, wherein the one or more scaling factors comprises a first scaling factor and a second scaling factor, wherein depending on whether a second variable associated with the video bitstream indicates that the first scaling factor is equal to a first default value, the first scaling factor is used to derive one of the first MVD and the second MVD, and the second scaling factor used to derive the other one of the first MVD and the second MVD and is a second default value different than the first default value.

5. The method of claim 1, wherein a context of the one or more scaling factors is based on encoded information of the current block or one or more neighboring blocks to the current block.

6. The method of claim 1, wherein at least one of the first MVD and the second MVD is derived according to $$derived\_mvd = \frac{td1}{td0} * scaled\_factor * joint\_mvd,$$

when td1 is greater than td0, and according to $$derived\_mvd = \frac{td0}{td1} * scaled\_factor * joint\_mvd,$$

when td0 is greater than td1, wherein td0 corresponds to the distance between the first reference frame and the current frame, and td1 corresponds to a distance between the second reference frame and the current frame.

7. The method of claim 1, wherein both of first MVD and the second MVD are derived according to $$derived\_mvd = \frac{td1}{td0} * \frac{scaled\_factor}{M} * joint\_mvd,$$

when td1 is greater than td0, and
according to $$derived\_mvd = \frac{td0}{td1} * \frac{scaled\_factor}{M} * joint\_mvd,$$

when td0 is greater than td1, wherein td0 corresponds to a distance between the current frame and the first reference frame, td1 corresponds to a distance between the current frame and the second reference frame, and M corresponds to $2^n$ where n is an integer.

8. A method of video encoding, the method comprising:
receiving video data; and
encoding the video data into a bitstream representing a current block, in a current frame, a first reference frame, associated with the current block, and a second reference frame associated with the current block, and, based on at least a first variable signaled with the bitstream, the encoded video data signals whether to:
derive a first motion vector difference (MVD) associated with the first reference frame based on the first variable indicating a first scaling factor in a joint motion vector difference (JMVD) mode, and
derive a second MVD associated with the second reference frame based on the first variable indicating a second scaling factor in the JMVD mode.

9. The method of claim 8,
wherein the bitstream is associated with the JMVD and a second variable indicating whether the one or more scaling factors are used to derive the MVD from the JMVD, and
wherein the second variable indicates a pair of scaling factors for the first reference frame and the second reference frame.

10. The method of claim 8, wherein the one or more scaling factors are restricted to at least one of:
values of $2^n$, where n is an integer value, and
values of m/M, where $M=2^n$ and m and n are integer values.

11. The method of claim 8,
wherein the one or more scaling factors comprises a first scaling factor and a second scaling factor, wherein depending on whether a second variable associated with the bitstream indicates that the first scaling factor is equal to a first default value, the first scaling factor is used to derive one of the first MVD and the second MVD, and the second scaling factor used to derive the other one of the first MVD and the second MVD and is a second default value different than the first default value.

12. The method of claim 8, wherein a context of the one or more scaling factors is based on information of the current block or one or more neighboring blocks to the current block.

13. The method of claim 8, wherein at least one of the first MVD and the second MVD is derived according to $$derived\_mvd = \frac{td1}{td0} * scaled\_factor * joint\_mvd,$$

when td1 is greater than td0, and according to $$derived\_mvd = \frac{td0}{td1} * scaled\_factor * joint\_mvd,$$

when td0 is greater than td1, wherein td0 corresponds to the distance between the first reference frame and the current frame, and td1 corresponds to a distance between the second reference frame and the current frame.

14. The method of claim 8, wherein both of first MVD and the second MVD are derived according to $$derived\_mvd = \frac{td1}{td0} * \frac{scaled\_factor}{M} * joint\_mvd,$$

when td1 is greater than td0, and
according to $$derived\_mvd = \frac{td0}{td1} * \frac{scaled\_factor}{M} * joint\_mvd,$$

when td0 is greater than td1, wherein td0 corresponds to a distance between the current frame and the first reference frame, td1 corresponds to a distance between the current frame and the second reference frame, and M corresponds to $2^n$ where n is an integer.

15. A method of encoding visual medial data, the method comprising:
generating a bitstream of the visual media data according to an encoding process,
the bitstream of the visual media data representing a current block, in a current frame, a first reference frame, associated with the current block, and a second reference frame associated with the current block, based on at least a first variable signaled with the bitstream, the encoded video data signals whether to:
derive a first motion vector difference (MVD) associated with the first reference frame based on the first variable indicating a first scaling factor in a joint motion vector difference (JMVD) mode, and
derive a second MVD associated with the second reference frame based on the first variable indicating any of the first scaling factor and a second scaling factor in the JMVD mode; and transmitting the generated bitstream of the visual media data.

16. The method of claim 15, wherein the bitstream is associated with the JMVD and a second variable indicating whether the one or more scaling factors are used to derive the MVD from the JMVD, and wherein the second variable indicates a pair of scaling factors for the first reference frame and the second reference frame.

17. The method of claim 15, wherein the one or more scaling factors are restricted to at least one of:

values of $2^n$, where n is an integer value, and values of m/M, where $M=2^n$ and m and n are integer values.

18. The method of claim 15, wherein the one or more scaling factors comprises a first scaling factor and a second scaling factor, wherein depending on whether a second variable associated with the bitstream indicates that the first scaling factor is equal to a first default value, the first scaling factor is used to derive one of the first MVD and the second MVD, and the second scaling factor used to derive the other one of the first MVD and the second MVD and is a second default value different than the first default value.

19. The method of claim 15, wherein at least one of the first MVD and the second MVD is derived according to $$\text{derived\_mvd} = \frac{td1}{td0} * \text{scaled\_factor} * \text{joint\_mvd},$$

when td1 is greater than td0, and according to $$\text{derived\_mvd} = \frac{td0}{td1} * \text{scaled\_factor} * \text{joint\_mvd},$$

when td0 is greater than td1, wherein td0 corresponds to the distance between the first reference frame and the current frame, and td1 corresponds to a distance between the second reference frame and the current frame.

20. The method of claim 15, wherein both of first MVD and the second MVD are derived according to $$\text{derived\_mvd} = \frac{td1}{td0} * \frac{\text{scaled\_factor}}{M} * \text{joint\_mvd},$$

when td1 is greater than td0, and according to $$\text{derived\_mvd} = \frac{td0}{td1} * \frac{\text{scaled\_factor}}{M} * \text{joint\_mvd},$$

when td0 is greater than td1, wherein td0 corresponds to a distance between the current frame and the first reference frame, td1 corresponds to a distance between the current frame and the second reference frame, and M corresponds to $2^n$ where n is an integer.

\* \* \* \* \*